United States Patent [19]
Philippe et al.

[11] Patent Number: 5,510,923
[45] Date of Patent: Apr. 23, 1996

[54] TELECOMMUNICATIONS SYSTEM COMBINING WAVELENGTH MULTIPLEXING AND PACKET SWITCHING NETWORKS

[75] Inventors: Guignard Philippe, Pleumeur Bodou; André Hamel, Lannion, both of France

[73] Assignee: France Telecom Etablissement Autonome De Droit Public, Paris, France

[21] Appl. No.: 416,432

[22] Filed: Apr. 3, 1995

Related U.S. Application Data

[63] Continuation of Ser. No. 41,826, Apr. 1, 1993, abandoned.

[30] Foreign Application Priority Data

Apr. 3, 1992 [FR] France ................... 92 04080

[51] Int. Cl.⁶ .................................................. H04J 14/08
[52] U.S. Cl. ........................ 359/137; 359/123; 359/125; 359/118
[58] Field of Search ........................... 359/115, 118, 359/123, 124, 125, 135, 137

[56] References Cited

U.S. PATENT DOCUMENTS

| | | | |
|---|---|---|---|
| 4,797,879 | 1/1989 | Habbab et al. | 359/152 |
| 4,817,087 | 3/1989 | Yamada | 370/85 |
| 4,821,255 | 4/1989 | Kobrinski | 359/139 |
| 4,866,704 | 9/1989 | Bergmann | 359/128 |
| 5,018,130 | 5/1991 | Suzuki et al. | 359/123 |
| 5,099,347 | 3/1992 | Daniele et al. | 359/123 |
| 5,144,466 | 9/1992 | Nakamura et al. | 359/123 |
| 5,157,659 | 10/1992 | Schenkel | 370/85.3 |

FOREIGN PATENT DOCUMENTS

| | | | |
|---|---|---|---|
| 0251790 | 3/1988 | European Pat. Off. | H04Q 11/04 |
| 0364638 | 4/1990 | European Pat. Off. | H04L 12/28 |
| 0407078 | 1/1991 | European Pat. Off. | H04Q 12/28 |
| 0151125 | 6/1988 | Japan | 359/123 |
| 0011494 | 1/1989 | Japan | 359/123 |
| 0305698 | 12/1989 | Japan | 359/123 |

OTHER PUBLICATIONS

French Search Report—FR9204080—FA 471686.

*Primary Examiner*—Leo Boudreau
*Assistant Examiner*—Rafael Bacares
*Attorney, Agent, or Firm*—Pearne, Gordon, McCoy & Granger

[57] ABSTRACT

The network according to the invention combines a circuit switching multicoloured optical network (R1) and a packet switching network (R2). The circuit switching network is adapted to transmit data at a high rate. The packet switching network is adapted to transmit data at an average rate. Control data are carried on the packet switching network. This provides more efficient transmission of data and effectively handles peak transmission rates. The invention has application to telecommunications.

8 Claims, 3 Drawing Sheets

5,510,923

TELECOMMUNICATIONS SYSTEM COMBINING WAVELENGTH MULTIPLEXING AND PACKET SWITCHING NETWORKS

This is a continuation of application Ser. No. 08/041,826, filed Apr. 1, 1993 now abandoned.

TECHNICAL FIELD

The present invention relates to a telecommunications network. This term is used to designate a plurality of stations connected to the same physical support and which exchange informations.

PRIOR ART

Optical telecommunications networks are known, which use optical beams having several wavelengths. These networks are referred to hereinafter as multicoloured networks. Multicoloured networks make it possible to considerably increase the network capacity. Thus, each wavelength can convey rates of several Gbit/s. An example of a multicoloured network is the broad band LAMBDANET (registered trademark) network of the US company BELLCORE. This network comprises several optical sources grouped on an optical coupler. All the wavelengths are simultaneously broadcast to each station, which comprises a fixed demultiplexer and a receiver for each wavelength. Such a network is not suitable for a large number of stations and would in fact lead to an excessive number of transmitters and receivers.

More recently, the US company IBM has described in the Lightwave Journal of March 1991 an optical network having 32 stations based on a star architecture. The introduction of a tunable optical filter makes it possible to reduce the number of detectors. The component used is a FABRY-PEROT filter controlled by a piezoelectric displacement shim or wedge. The control of the network is obtained by periodic scanning of the different channels transmitted on the network.

Although satisfactory in certain respects, these multicoloured optical networks suffer from a disadvantage. Thus, in the state of the art, all these networks are of the circuit switching type, as opposed to packet switching type. However, the circuit switching type is not appropriate for the sharing of one support by several stations, which makes it difficult to control the network and in particular establish, break and monitor communications.

Naturally packet switching networks are also known. The local networks of companies generally operate according to this principle. This makes it possible to bring about a time share of the physical support between all the users. This switching type offers great flexibility for current exchanges, but undergoes an efficiency reduction in the case of network congestion. In order to absorb occasional traffic peaks and therefore avoid network saturation, it is necessary to increase the operating speed. However, most of the time the network operates at below its capacity. Moreover, the switching used implies a subdividing of the informations into packets, so that it is necessary to add supplementary information to each packet, e.g. linked with the routing. This data addition leads to an overrate and therefore to an overall network efficiency reduction.

Packet switching networks use a metal cable or optical fibre. However in the latter case, the fibre is only introduced as a transmission support and the optical possibilities are hardly used.

DESCRIPTION OF THE INVENTION

The object of the present invention is to obviate the respective disadvantages of these two network types. To this end, it proposes a composite network in the sense that it combines a circuit switching multicoloured optical network with a packet switching network. The information transfers requiring a high rate take place on the different wavelengths of the multicoloured network in circuit switching. Two stations wishing to exchange a large quantity of informations are appropriate for one or two wavelengths (one for each transmission direction), in order to establish between them two crosslinks and thus transmit the informations. This avoids the overrate which would be involved by the subdivision of the informations to be transmitted, if they were transmitted on a packet switching network. The packet switching network can be dimensioned for an average traffice, knowing that the traffic peaks will be absorbed by the multicoloured network.

The multicoloured network control informations and particularly those useful for the establishment of the optical link between two stations, transit in the packet mode on the packet switching network.

The invention is applicable to all multicoloured network types in which dynamic wavelength selections are possible. Wavelength selection can take place by tuning a transmitter component (e.g. a semiconductor laser), tuning a tunable optical filter or any component fulfilling the same function (e.g. a FABRY-PEROT etalon) or by a local oscillator in coherent detection.

DETAILED DESCRIPTION OF EMBODIMENTS

Figure 1:
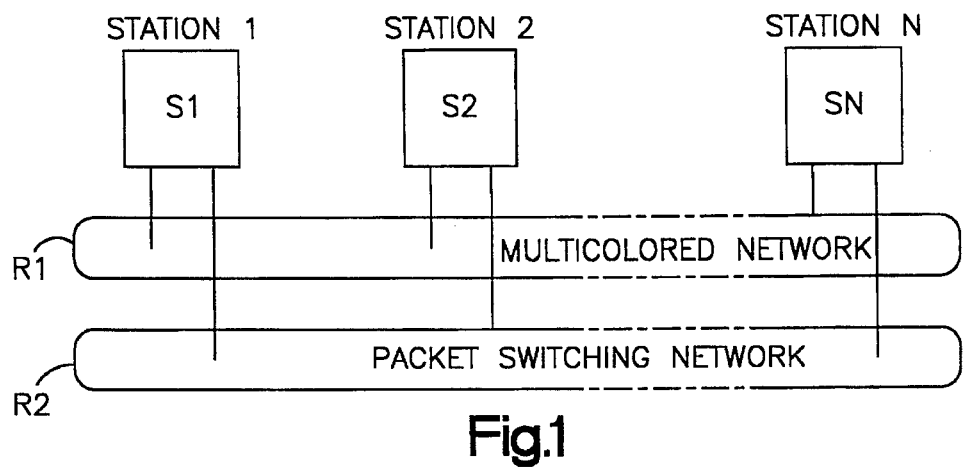
FIG. 1 shows the general structure of a network according to the invention.

FIG. 1 shows a general diagram of a network according to the invention. This network comprises a first multicoloured optical circuit switching network R1 and a second packet switching network R2. To these two networks are connected various stations S1, S2, . . . , SN.

Figure 2:
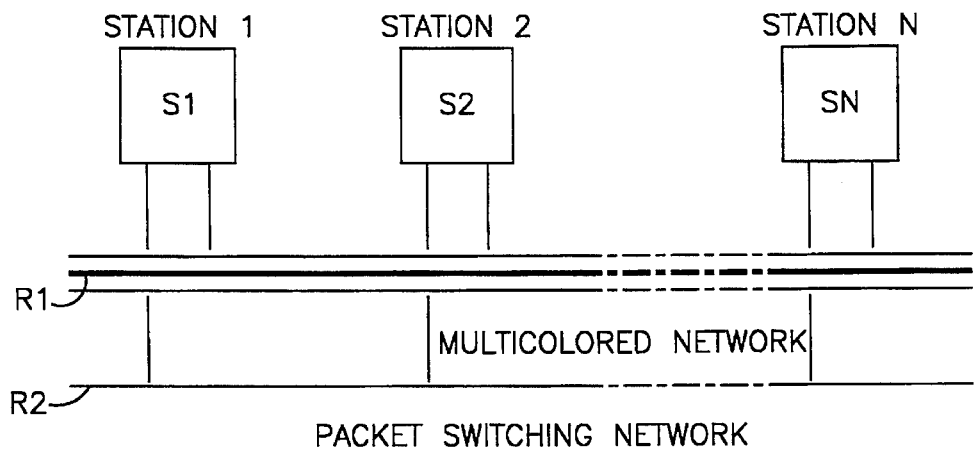
FIG. 2 illustrates a variant in which the packet switching network uses a metal cable as the support.

FIG. 2 shows a variant in which the network R2 uses a support in the form of a metal cable (symbolized by a single line), whereas the network R1 uses an optical support (symbolized by a triple line).

Figure 3:
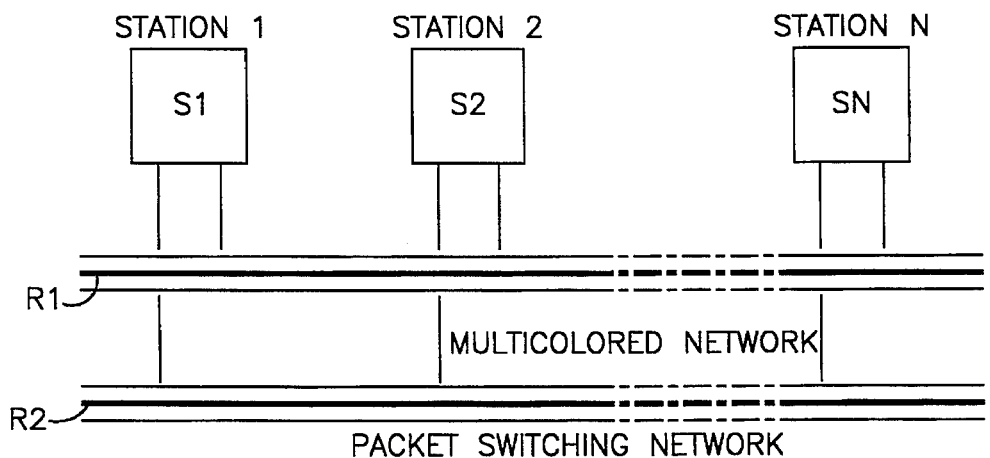
FIG. 3 illustrates a variant in which the packet switching network uses an optical network as the support.

In FIG. 3, the network R2 also uses an optical support, as does the network R1.

Figure 4A:
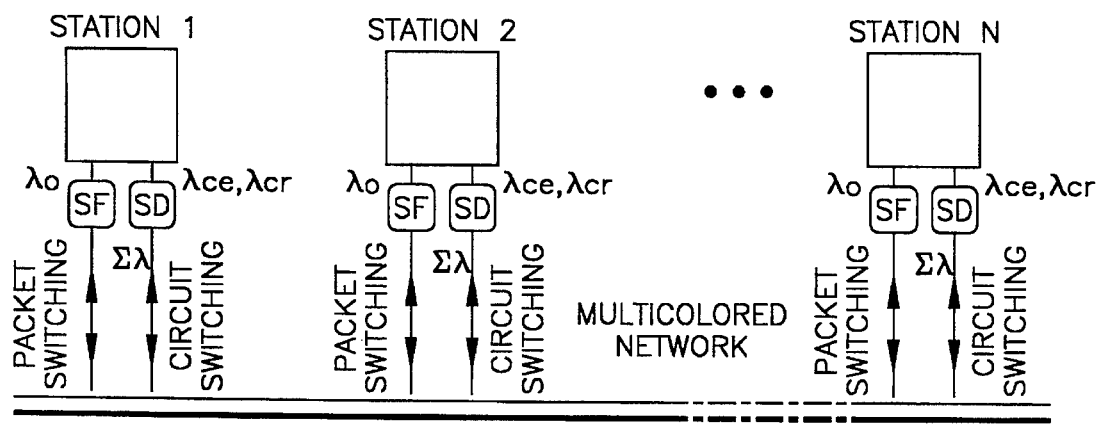
FIGS. 4a and 4b illustrate two variants, where two networks use the same optical support.
Figure 4B:
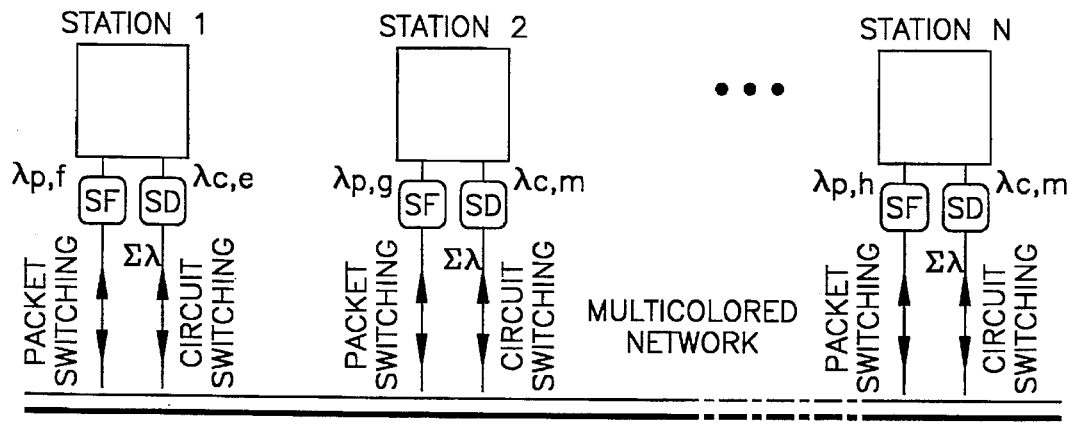

In FIGS. 4a and 4b the same optical support (in practice the same optical fibre) is used both for the first and second networks. In the variant of FIG. 4a, each station is associated with a dynamic wavelength selection module SD for circuit switching transmission and a fixed wavelength selection module SF for packet switching transmissions. In circuit switching, the stations operate with wavelengths $\lambda ce$ (in transmission) and λcr (in reception). The pairs of wavelengths are different for all the stations, except for those which are in communication with one another, in which case the transmission wavelength of one is the reception wavelength of the other. In packet switching, each station operates on a wavelength λo.

The wavelength used for the packet switching network can be close to the wavelength used by the multicoloured network and accessible by tunable elements thereof. This configuration leads to increased reliability because, in the case of a failure of the optical equipments connected to the packet switching network, it is possible to tune the optical equipments connected to the multicoloured network to the wavelength used for the packet switching network, in order to ensure the minimum service.

In the variant of FIG. 4, each station is associated with two dynamic wavelength selection modules SD. In circuit switching, each station uses a wavelength λcl or λcm ... λcn, in which l, m ... n are references between 1 and i. In packet switching, each station operates with the wavelength λpf or λpg, ..., λph in which f, g, ..., h are references from 1 to j.

Figure 5:
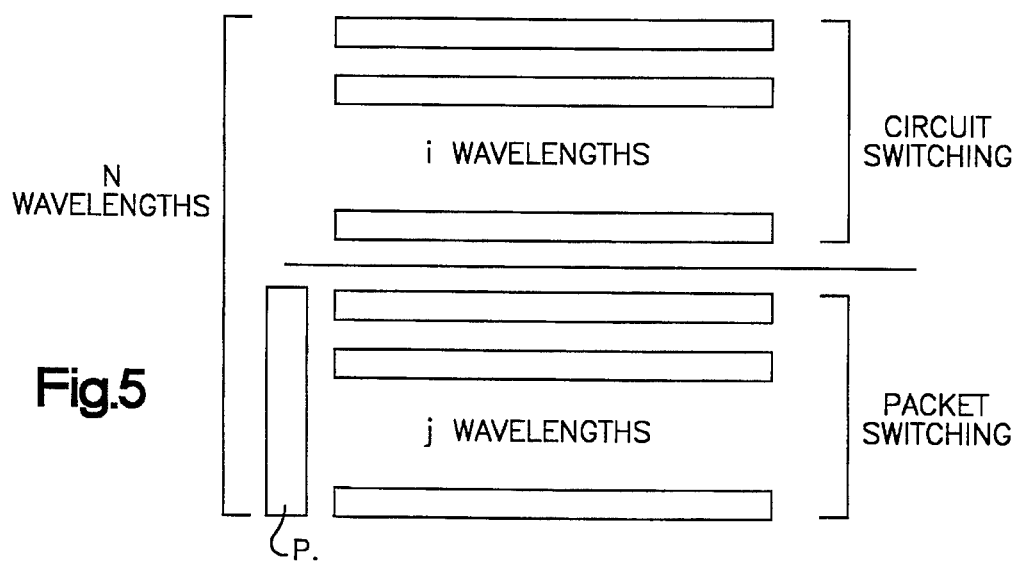
FIG. 5 is a diagram showing two wavelength groups respectively allocated to the two switching types.

In more general terms, the network can operate on the same fibre with the N different wavelengths used and as illustrated in FIG. 5:

i wavelengths associated with the same number of channels usable in circuit switching;

j wavelengths associated with the same number of superimposed networks all functioning in packet switching.

The putting into place of j wavelengths associated with packet switching services makes it possible either to share out the corresponding traffic load on these different wavelengths, or associate each wavelength with a particular category of services with e.g. within a company, or with a category of users. As a function of the requirements of the network control, a station can be equipped in such a way as to have access to one, several or all the wavelengths. Bridges (P in FIG. 5) responsible for transferring traffic from one wavelength to another can be introduced onto the network. The j wavelengths associated with a circuit switching are controlled in the same way as in the examples of FIGS. 2 to 4.

For the variants of FIGS. 2, 3, 4a and 4b, a single tunable element for each station (transmitter or receiver) is necessary if one has the same number of usable wavelengths as there are stations connected to the multicoloured network. A fixed, different wavelength is therefore assigned to each station, either for transmission, or for reception. If the number of stations exceeds the number of available wavelengths, these wavelengths must be shared between the stations. They will then be allocated as a function of the communications to be established. This makes it necessary to use tunable elements both on transmission and on reception. The variant of FIG. 4 implies tunable elements on transmission and on reception. The variant of FIG. 5 can group stations having tunable transmission and/or reception.

The invention described hereinbefore can be used in numerous networks. Thus, reference can be made to any data network requiring a large transmission capacity. The data to be transmitted can be in digital or analog form (e.g. images). These two information types can coexist on the same network at different wavelengths. One application is e.g. a professional, high quality, moving picture transmission network, because it is entirely optical. Reference is also made to a data network requiring confidentiality of transmissions between stations. The possibility of isolating certain stations on particular wavelengths, still using the same physical support being of particular interest. Reference is also made to corporate networks of the LAN (Local Area Network) or MAN (Metropolitan Area Network) type. It is also possible to retain a network of this type which has already been installed and reaching the limit of its capacity, by superimposing a multicoloured network on it.

Figure 6:
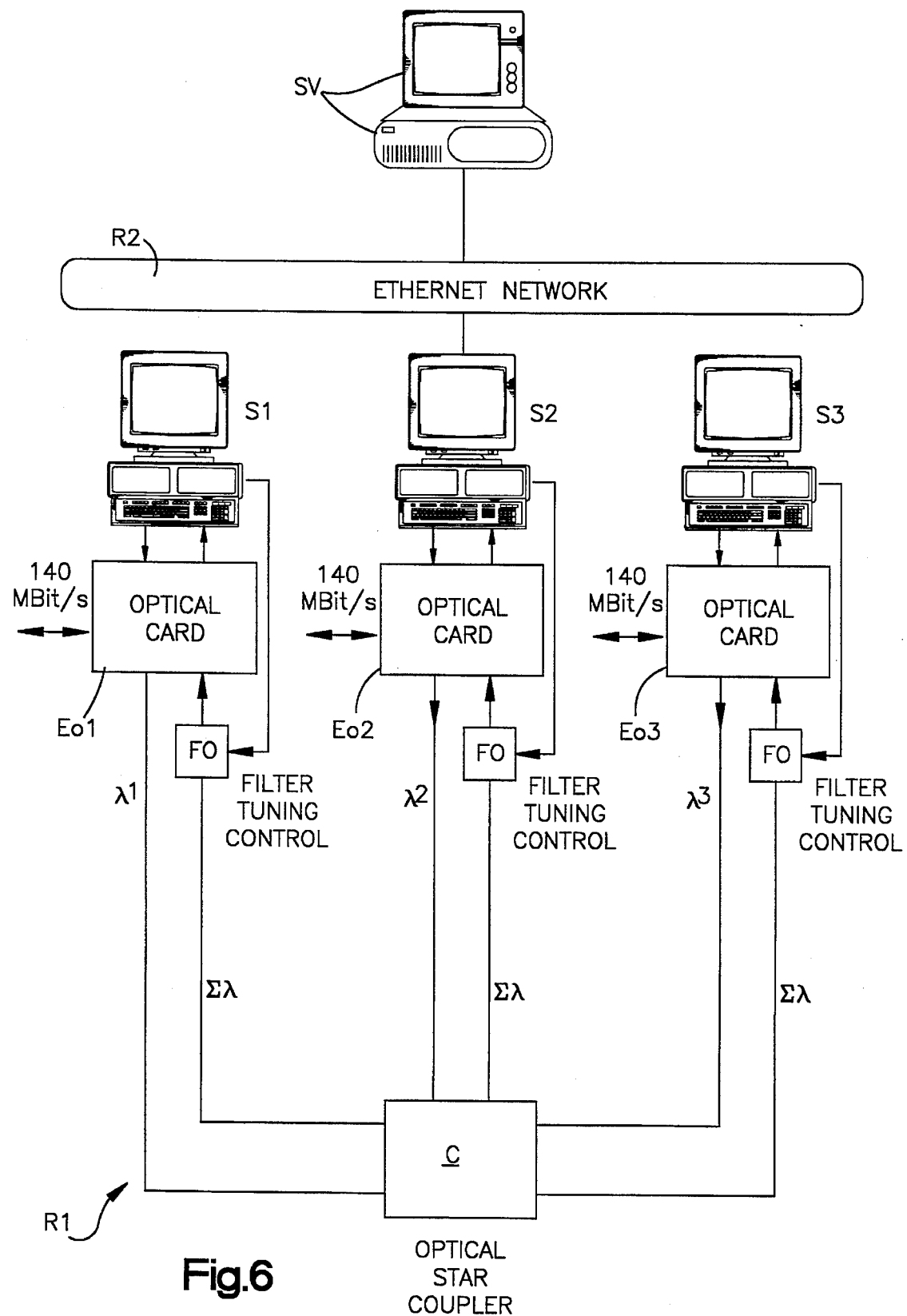
FIG. 6 shows an embodiment of a network according to the invention.

FIG. 6 shows an embodiment corresponding to a combination of a circuit switching multicoloured network and a packet switching network on a coaxial cable and in the present case an ETHERNET (registered trademark) network. This network R2 uses a coaxial cable and operates at 10 Mbit/s. It is associated with a star-type optical network R1 on a monomode fibre. Each station S1, S2, S3 is connected on the one hand to the ETHERNET network and on the other to the optical network by means of an optical equipment E01, E02, E03 operating at 140 Mbit/s. Each station has a laser DFB emitting at a fixed wavelength and, in reception, a tunable optical filter making it possible to select a particular wavelength. This tunable filter, using a network installed on a deformable structure having a piezoelectric shim or wedge, has a spectral width of 3 nm at −3 dB for an insertion loss of 3 dB. The tuning range is 60 nm from 1500 to 1560 nm. The core of the optical network is the passive star coupler C. The optical budget is 22 dB, which makes it possible to significantly increase the number of stations and the distance separating them.

Communication establishment and breaking, as well as the monitoring of the network take place from terminals associated with each station, which communicate with one another and with a server SV by means of the ETHERNET network.

We claim:

1. Telecommunications network comprising:

a plurality of stations exchanging information at a high rate or at an average traffic, a first network of a wavelength multiplexing optical type, said first network operating in a spatial switching mode, said first network being connected for transmitting information between said stations at said high rate, a second network operating in a packet switching mode, said second network being connected for transmitting information between said stations at said average traffic, said second network having a traffic capacity limit and said high rate exceeding the limit, said networks being connected for sharing information traffic such that the information is transmitted on said first network when the rate of transmitting information between said stations is above the limit and information traffic is shifted so that the information is transmitted on said second network when the rate of transmitting information is below the limit, said information traffic being shifted back to the first network when the rate returns to being above the limit, and said first network being controlled by control information for accomplishing said sharing, said control information being transmitted on said second network in said packet switching mode.

2. Telecommunications network according to claim 1, wherein said second network comprises a transmission support in the form of an electric line.

3. Telecommunications network according to claim 2, wherein said transmission support of said second network is a coaxial cable.

4. Telecommunications network according to claim 1, wherein said second network comprises an optical fibre.

5. Telecommunications network according to claim 1, wherein said first network and said second network use a same optical guide.

6. Telecommunications network according to claim 5, wherein said first network operates with a plurality of i different wavelengths wherein i is an integer.

7. Telecommunications network according to claim 5, wherein said second network operates with a plurality of j different wavelengths wherein j is an integer.

8. (new) Telecommunications network comprising:

a plurality of stations exchanging information at a high rate or at an average traffic, a first network of a wavelength multiplexing optical type, said first network operating in a spatial switching mode, said first network being connected for transmitting information between said stations at said high rate, a second network operating in a packet switching mode, said second network being connected for transmitting information between said stations at said average traffic, said networks being connected for sharing information traffic such that the information is transmitted on said first network when the rate of transmitting information between said stations is at said high rate and the information is transmitted on said second network when the rate of transmitted information is at said average traffic, and said first network being controlled by control information for accomplishing said sharing, said control information being transmitted on said second network in said packet switching mode.

* * * * *